United States Patent [19]

Backlund et al.

[11] Patent Number: 4,984,119
[45] Date of Patent: Jan. 8, 1991

[54] CLEANING APPARATUS FOR MAGNETIC DATA TAPE CARTRIDGES

[75] Inventors: Richard A. Backlund; Sten R. Gerfast, both of St. Paul, Minn.

[73] Assignee: Minnesota Mining and Manufacturing Company, St. Paul, Minn.

[21] Appl. No.: 472,028

[22] Filed: Jan. 30, 1990

[51] Int. Cl.$^5$ .............................................. G11B 5/41
[52] U.S. Cl. ................................... 360/128; 360/132; 15/DIG. 12
[58] Field of Search ...................... 360/128, 132, 137, 130.3–130.34;
242/197–199; 15/DIG. 12, DIG. 13

[56] References Cited

U.S. PATENT DOCUMENTS

| | | |
|---|---|---|
| 3,872,520 | 3/1975 | Childress Jr. et al. .............. 360/137 |
| 4,221,348 | 9/1980 | Moeller ............................... 242/192 |
| 4,713,713 | 12/1987 | Lu ....................................... 360/128 |
| 4,722,016 | 1/1988 | Shivako et al. ................. 360/128 X |
| 4,734,815 | 3/1988 | Naganawa et al. ................. 360/133 |
| 4,803,584 | 2/1989 | Doi et al. ............................ 360/133 |

*Primary Examiner*—David J. Severin
*Assistant Examiner*—Alfonso Garcia
*Attorney, Agent, or Firm*—Donald M. Sell; Walter N. Kirn; Charles D. Levine

[57] ABSTRACT

A cleaning device for removing debris from the tape of a reel to reel magnetic data tape cartridge includes a cleaning material mounted adjacent the tape path to constantly contact and remove debris from the tape. Preferably, the cleaning material both wipes debris from the tape and retains the debris. The cleaning material may be mounted to rotate in response to the movement of the tape past the cleaning material. An alternate emebodiment which permits both sides of the magnetic tape to be cleaned includes mounting the cleaning material on a arm which is pivotably mounted to the cartridge. The arm pivots to maintain contact with the tape and is shaped to provide a plurality of contact portions between the cleaning material and the tape.

13 Claims, 2 Drawing Sheets

CLEANING APPARATUS FOR MAGNETIC DATA TAPE CARTRIDGES

TECHNICAL FIELD

The present invention relates to a two reel, belt driven data tape cartridge. More particularly, the present invention relates to a magnetic data tape cartridge having a cleaning device within the cartridge.

BACKGROUND OF THE INVENTION

In a reel to reel, belt driven tape cartridge, a drive roller drives an elastic driving belt which contacts the tape on the reels to drive the tape from reel to reel. A tape path extends between the reels and along one edge of the cartridge across a cutaway portion providing access to the tape by a transducer which is a part of a tape drive which receives the cartridge. The tape path is defined by at least two tape guides and a pair of tape wrap pins, as originally disclosed in U.S. Pat. No. 4,221,348 to Moeller. One tape guide and one wrap pin are positioned on each side of the cutaway portion of the cartridge. Each tape wrap pin is positioned between each reel and the adjacent tape guide to deflect the tape from a straight line path between the tape supply on the reel and the tape guide to increase the frictional coupling between the tape and the tape wrap pin as the amount of tape wound on the reel increases and maintain constant tape tension at the transducer.

These data tape cartridges are used in many environments. In environments such as manufacturing, debris may accumulate in the cartridges. Additionally, some debris can be generated during operation of the cartridge. This debris may affect the ability of the transducer to transfer data to and from the data tape and thereby increase error rates, despite the incorporation of error correction circuitry in the drive. This problem with debris is not exclusive to data tape cartridges.

Floppy disks have long encountered this problem and in recent years, have incorporated media cleaners in their packaging. U.S. Pat. No. 4,803,584 to Doi et al. discloses a cleaning sheet of nonwoven fabric attached to the inside surface of the floppy disk case. Floppy disks having cleaning sheets on the inside surfaces of the case to clean the disk surfaces are common today in many commercially available disks. Additionally, cleaners have also been used in rigid disk cartridges. U.S. Pat. No. 4,734,815 to Naganawa et al. discloses placing cleaning sheets between each side of the disk and the adjacent walls of the cartridge. These are merely a few examples of the use of cleaning sheets incorporated into containers for disk type data storage devices.

In U.S. Pat. No. 3,872,510 to Childress Jr. et al. a magnetic tape cleaning and tensioning apparatus is described as being incorporated within a cartridge having a magnetic tape loop. During use, the cartridge is inserted into a fixed frame having a capstan. In the cartridge, a cleaning pad is disposed on one surface of a cleaning and tensioning pad holder which contacts the tape as the tape winds around a roller. The cleaning pad is an integral part of the tensioning apparatus. The tensioning apparatus is required because prior to being tensioned, the tape within the cartridge serpentines around a series of rollers in an untensioned state. Moreover, the device of this patent is used within an endless loop tape cartridge having a small amount of tape. This device is part of an apparatus which is required to tension the tape to permit the tape to perform properly, and must be located proximate the location at which the tape enters in the fixed frame.

Heretofore there has been no known simple yet effective cleaning apparatus located within a reel to reel data tape cartridge to clean the tape by wiping debris from the tape and retaining the debris to prevent the debris from further impairing tape performance.

SUMMARY OF THE INVENTION

A cleaning device for removing debris from the magnetic tape according to the present invention is located within the tape cartridge. In the tape cartridge, the tape extends between two tape reels along a tape path defined by a guide pin and a pair of tape guides. Each tape guide is located adjacent one edge of the cartridge and is associated with one of the tape reels. The cleaning device is located adjacent the path of the tape between one tape guide and its associated tape reel to contact the tape to remove debris. The cleaning device may be mounted adjacent either tape reel anywhere within the cartridge as long as contact is maintained with the tape regardless of the amount of tape wound on the tape reel. The cleaning device is secured in this location and may be fixed or movable. Preferably, the cleaning device includes a cleaning material capable of wiping debris from the tape and retaining the debris to prevent the debris from further impairing tape performance.

In a first embodiment, the cleaning material is rigidly mounted to a wiper support which is mounted on one wrap pin. Alternatively, the wiper support may rotate around the wrap pin in response to movement of the tape past the cleaning material. This provides a plurality of contact portions on the cleaning material to alternately contact the tape and allow debris to be removed from the tape at more than one portion of the cleaning material.

In a second embodiment, the cleaning material is positioned to clean both sides of the magnetic tape. The cleaning material simultaneously contacts the tape wound on the tape reel and the tape extending from the tape reel along the tape path. This is accomplished by mounting the cleaning material on the free end of a mounting arm which is pivotably mounted in the cartridge. The cleaning material preferably extends beyond the free end to wedge between the tape on the tape reel and the tape extending from the tape reel to improve tape contact. The changing radius of the tape wound on the tape reel pivots the mounting arm which shifts the cleaning material along an arc traversed by the mounting arm free end to maintain contact between the cleaning material and the tape. This provides a plurality of contact portions on the cleaning material to alternately contact the tape to allow debris to be removed from the tape at more than one area on the cleaning material.

BRIEF DESCRIPTION OF THE DRAWINGS

FIGS. 3a and 3b are top views of a portion of a tape cartridge having a cleaning device according to still another embodiment of the present invention wherein FIG. 3a illustrates the cleaning device positioned adjacent a full reel of tape and FIG. 3b illustrates the cleaning device positioned adjacent a relatively empty reel.

DETAILED DESCRIPTION OF PREFERRED EMBODIMENT

The drawings illustrate a cartridge used in a recording and/or reproducing machine, hereinafter referred to as a data cartridge tape drive (not shown). The tape drive typically includes a support frame including a horizontal cartridge support deck which supports a magnetic transducer or recording head and a reversible drive motor. The drive motor shaft carries a drive roller above the support deck, and elongate guides define a position for the cartridge on the support deck.

Figure 1:
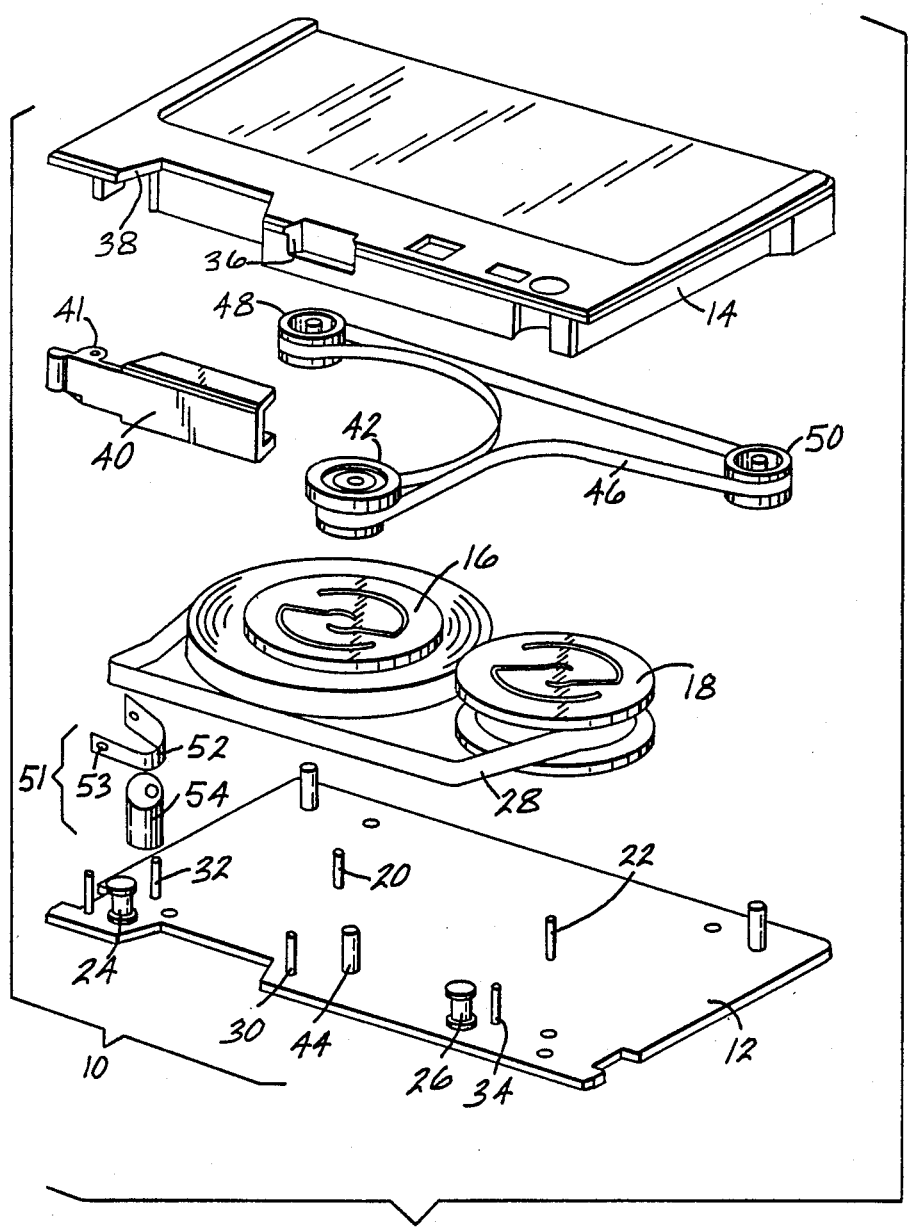
FIG. 1 is an exploded, perspective view of a tape cartridge having a cleaning device according to one embodiment of the present invention.

Referring to FIG. 1, a tape cartridge 10 includes a thin, generally rectangular enclosure formed by a base plate 12 and a cover 14. Enclosed within the cartridge 10 are a pair of reels 16, 18 which are mounted on respective reel pins 20, 22 extending from the base plate 12. Tape guides 24 and 26 also are mounted on the base plate 12 and guide the magnetic tape 28 to and from the tape reels 16, 18. A guide pin 30, disposed on the base plate 12 intermediate the two tape guides 24, 26 also guides the magnetic tape 28. Two tape wrap pins 32, 34 are mounted on the base plate 12 adjacent the tape guides 24 and 26, respectively. The cartridge 10 is formed with an opening 36 which extends into the front edge wall centrally of the length of the edge wall to provide access for the drive roller of the tape drive. This edge wall is also formed with a cutaway portion 38 for access to the magnetic tape 28 by the magnetic recording head. A door 40, which closes the cutaway portion 38, is hinged at 41 and biased closed to cover the cutaway portion 38 of the cartridge. The magnetic tape 28 is driven from reel to reel via a drive system including a drive roller 42 which is mounted on a drive roller pin 44. The drive roller 42 drives a driving belt 46 which winds around corner belt guide rollers 48, 50.

The tape reels 16 and 18 are supported on their respective reel pins 20 and 22 for free rotation around spaced parallel axes. The tape 28 is wound on the reels 16, 18 in opposite directions about their axes. A tape guide path between the reels 16, 18 is defined by the tape guides 24 and 26 and the tape guide pin 30 in addition to the two tape wrap pins 32 and 34. One tape guide 24 is positioned on one side of the cartridge cutaway portion 38 and is associated with the tape reel 16. The other tape guide 26 along with the guide pin 30 are positioned along the edge wall of the cartridge on the opposite side of the cutaway portion 38, and the tape guide 26 is associated with the tape reel 18. One tape wrap pin 32 is positioned between the reel 16 and the adjacent tape guide 24, and the other tape wrap pin 34 is positioned between the reel 18 and its adjacent tape guide 26. Each tape wrap pin is positioned to deflect the tape from a straight line between the tape reel and the respective tape guide, and to increase this deflection as tape is wound on that reel. The tape wrap pin provides a load on the tape to increase and stabilize tape tension along the tape length, thereby improving contact between the tape and the transducer.

In a first embodiment of the present invention as shown in FIG. 1, a cleaning device 51 is disposed within the cartridge 10 to clean the magnetic tape 28. The cleaning device 51 includes a cleaning material 52 which is wrapped around a wiper support 54. The wiper support 54 is mounted on the tape wrap pin 32 associated with the tape reel 16, although wiper support 54 and cleaning material 52 may be mounted on the tape wrap pin 34. By mounting the wiper support 54 on a tape wrap pin, the cleaning material 52 maintains constant contact with the magnetic side of the magnetic tape 28 regardless of the amount of tape wound on the tape reel. This location is additionally desirable because no major modifications to the existing components are necessary. In tape cartridges which do not use wrap pins, the wiper support would be preferably mounted in the cartridge at substantially this location in any known fashion. This location is superior to any location along the front edge of the cartridge between the tape guides 24, 26 because there is insufficient room along the front edge for the cleaning device and because the cleaning material would not clean the magnetic side of the tape.

Wiper support 54 is curved and, as shown, preferably is cylindrical to provide a curved wiping surface for the cleaning material 52. This curved wiping surface provides a plurality of contact portions which extend around the cleaning material. These portions alternately contact the tape as the varying radius of the tape wound on the tape reel alters the angle from the tape reel at which the tape passes the cleaning device 51. This spreads retained debris over a larger area of the cleaning material to extend the life of the cleaning device as compared with a single contact point device.

The wiper support 54 may be affixed to its tape wrap pin by any means, or the wiper support and the tape wrap pin may be formed as one component. Additionally, the cleaning material 52 can be formed directly on each or both tape wrap pins 32, 34 by roughening the surface of the tape wrap pin as by sandblasting or glass bead blasting. It has been found that a roughness in the range of 10–20 microinches for the pins performs some cleaning functions. Roughnesses that are too low do not provide sufficient cleaning and higher roughnesses, while providing good levels of cleaning, may reduce tape life unacceptably. However, in some environments in which data cartridges are used, tape life is not a critical consideration. In these settings, such as in manufacturing environments, the data tape is used simply to record data which is downloaded in a different, cleaner environment onto another cartridge for further use.

It is preferred, as shown in the figures, that the cleaning material 52 be separate from and secured to the wiper support 54 by a securing device. An adhesive, either alone or as incorporated in a double-sided tape, may be used as long as the adhesive does not soak the cleaning material 52. Alternatively, as illustrated in FIG. 1, the cleaning material 52 can be screwed into the wiper support 54 via screws or other mechanical fasteners (not shown) passing through holes 53 formed in the cleaning material. Woven or nonwoven sheets can be used as the cleaning material as long as the material has the property of retaining and holding debris wiped from the tape. Woven cellulose wipers have been found to have these desired properties. Sandpaper or lapping films also can be used.

Experiments indicate that the cleaning device significantly reduces information transfer errors in data cartridges. Tests were conducted comparing data cartridges without cleaning devices with cartridges having the cleaning device of FIG. 1. In these tests 63% of the cartridges without the cleaning device experienced at least one information transfer error. However, with the cleaning device according to the present invention, no such errors occurred.

Tests also indicate that the cleaning device 51 of FIG. 1 does not impair the operating characteristics of the data cartridge. Although contact between the cleaning material 52 and the tape 28 changes the static and dynamic tape tensions, the drive force, and the belt tension, cartridge performance actually increased due to increased tape tension. Mean average tape tensions are 0.508 N at 0.76 m/s (30 ips) and 0.687 N at 2.28 m/s (90 ips) using the cleaning device 51 of FIG. 1, while the tape tensions without the cleaning device are 0.421 N and 0.648 N, respectfully. At 0.76 m/s, the mean minimum tape tension is increased from 0.378 N to 0.466 N with the cleaning device 51 of FIG. 1. At 2.28 m/s, the mean maximum tape tension is increased from 0.707 N to 0.737 N with the cleaning device 51. Thus, the tape tensions in the data cartridge are greater when the cleaning device 51 is used. When using the cleaning device 51, the dynamic tape tension, the belt tension, the required drive force, and the tracking deviation of data cartridges all remain within specification.

Further testing shows that when the cleaning device 51 of FIG. 1 is used, the cleaning material 52, due to its ability to retain debris, can become "clogged" or saturated with debris after a number of tape passes. This occurs notwithstanding the differing portions at which the tape contacts the cleaning material. When the cleaning material is saturated, further contact with the magnetic tape could possibly scratch the magnetic tape with the accumulated debris. To alleviate this, an alternate embodiment of the cleaning device provides many additional portions or areas of contact between the cleaning material and the magnetic tape.

Figure 2:
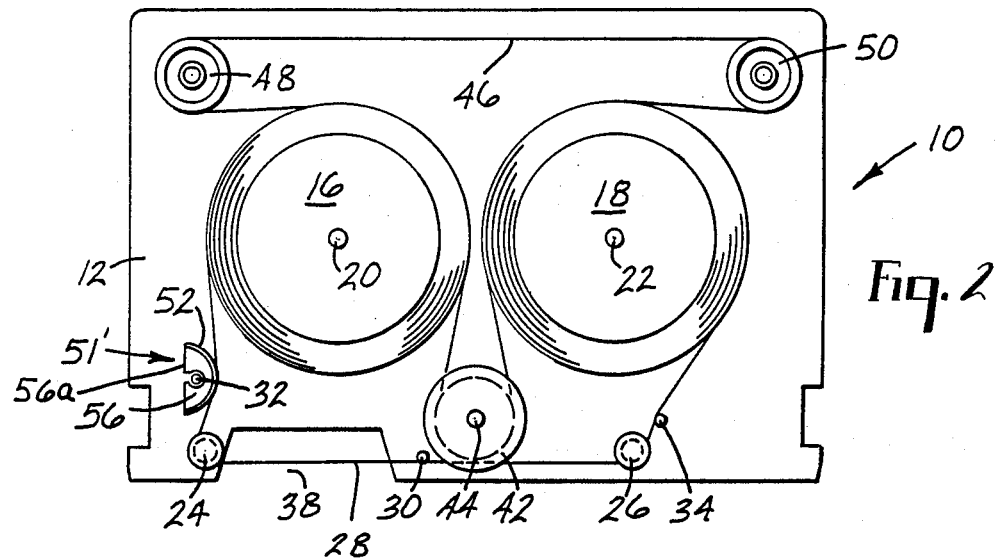
FIG. 2 is a top view of a tape cartridge having a cleaning device according to another embodiment of the present invention.

In the embodiment illustrated in FIG. 2, the cleaning material 52 of cleaning device 51' is mounted on a substantially semi-cylindrical wiper support 56 which is pivotably mounted on the tape wrap pin 32. In this embodiment, the wiper support 56 rotates around the tape wrap pin 32. Because the support 56 rotates, different portions of the cleaning material 52 will contact the magnetic tape as the magnetic tape is wound from one reel to the other. Many more portions contact the tape 28 due to rotation than otherwise would contact the tape solely by virtue of the changing radius of the tape wound on the reel 16. Moreover, the wiper support 56 is easy to install in the cartridge as it is simply disposed on the wrap pin 32 without any other modifications.

Preferably, the semi-cylindrical surfaces of the wiper support 56 and the cleaning surface of the cleaning material 52 have a radius of curvature larger than the distance from the center of the wrap pin 32 to the tape cleaning surface. This reduces the space requirements within the cartridge as compared to a cleaning surface having the same radius of curvature which is mounted at its center. Rotation of the wiper support 56 is caused by the movement and changes in direction of movement of the tape 28 past the cleaning material 52. Changing the direction of tape movement automatically changes the contact portions on the cleaning material without using any additional mechanisms. During operation, the forces on the tape 28 are not sufficient to rotate the wiper support 56 so the flat side 56a contacts the tape. However, stops (not shown) may be mounted within the cartridge 10 to insure that such rotation does not occur. Additionally, although a semi-cylindrical surface which rotates through a limited angle of rotation is shown, a full cylindrical surface can be used which completely rotates around its tape wrap pin.

FIG. 3 illustrates another embodiment of the cleaning device generally indicated as 57 in which the cleaning material 52 simultaneously contacts the tape 28 wound on the tape reel 16 as well as the tape extending from the tape reel along the tape path to clean both sides of the tape. In this embodiment, the cleaning device 57 includes a pivotable mounting arm 58 which carries the cleaning material 52. The mounting arm 58 is pivotably secured at its fixed end 60 at a location near the tape wrap pin 32. This location seems to provide better tape tensioning characteristics than locating the mounting arm at the location of the tape wrap pin and removing the wrap pin.

The mounting arm 58 extends from its fixed end 60 toward the tape reel 16 and has a free end 62 on which the cleaning material 52 is disposed. The cleaning material 52 on the free end 62 is positioned between the tape reel 16 and the tape 28 extending from the tape reel along the tape path. The cleaning material 52 resides on both sides of the free end 62 of the mounting arm 58 as shown in FIG. 3 to present two cleaning surfaces. Thus, the free end 62 of the mounting arm 58 has an inside surface 64 which is covered by cleaning material 52a which contacts and cleans the magnetic side of tape 28 on the tape reel 16, and an outside surface 66 which is covered by cleaning material 52b which contacts and cleans the back side of tape 28 extending from the tape reel.

Figure 3A:
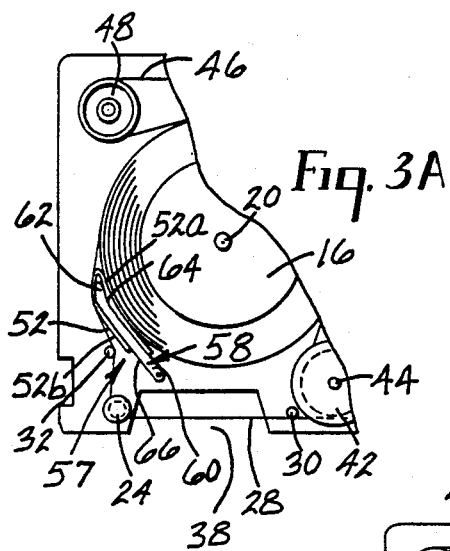
Figure 3B:
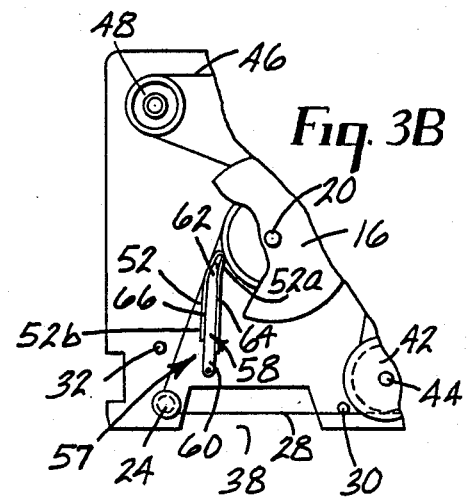

The winding of the tape automatically changes the contact portions on the cleaning material without using any additional mechanisms. This is accomplished by the orientation of the mounting arm 58 and the trapping of the cleaning material 52 between the portion of tape 28 leaving the tape reel 16 and the tape 28 wound on the tape reel 16. The cleaning material on free end 62 floats with the changing wound tape radius. This is illustrated in FIGS. 3a and 3b which show most of the tape wound on tape reel 16 in FIG. 3a, and tape reel 16 with almost no tape wound thereon in FIG. 3b. As tape is wound from or to the tape reel and the tape radius varies, the mounting arm 58 pivots around its fixed end 60. This, in turn, shifts the cleaning material 52 along an arc traversed by the mounting arm free end 62 to change the contact portion of the cleaning material 52 on the mounting arm 58 so that different contact areas on the cleaning material are used to clean the tape.

Preferably, the mounting arm 58 is shaped as the curve of FIG. 3, and is formed of a suitable material to permit the maintenance of contact with both the tape 28 wound on the tape reel 16 as well as the tape trailing off of the tape reel. Selecting an appropriate thickness for the mounting arm 58 also can maintain adequate contact. It has been found that a mounting arm thickness of approximately 0.1 mm to 0.3 mm performs well.

Furthermore, it is preferable to use a flexible material for the cleaning material 52 and to extend the flexible cleaning material 52 beyond the end of the free end 62 of the mounting arm 58. The extension of the cleaning material 52 beyond the free end 62 of the mounting arm 58 enables the cleaning material to more completely contact both sides of the tape. The extended cleaning material permits the cleaning device to reach the tape on almost empty reels while bending out of the way and wedging against the tape when the reel is full of tape. This enables the use of a shorter mounting arm to prevent the mounting arm from interfering with the winding of the tape on the reel when the reel is full of tape. Additionally, the wedging or trapping of the extended portion of the cleaning material 52 against the tape 28 as the tape is wound onto and off of the tape reel improves contact between the cleaning material 52 and both sides of the tape 28.

A further performance benefit is achieved by the mounting arm of FIG. 3. Typically, when the tape is wound in the data cartridge, air is entrapped between the tape layers. This air is removed by tape tension, drive belt pressure in the wound tape reels, and the roughness of the tape back coating. However, by forming the free end 62 of the mounting arm 58 in a relatively sharp point, air is removed before it becomes entrained between tape layers to improve winding. The mounting arm alters the air flow patterns and air is removed.

Figure 4:
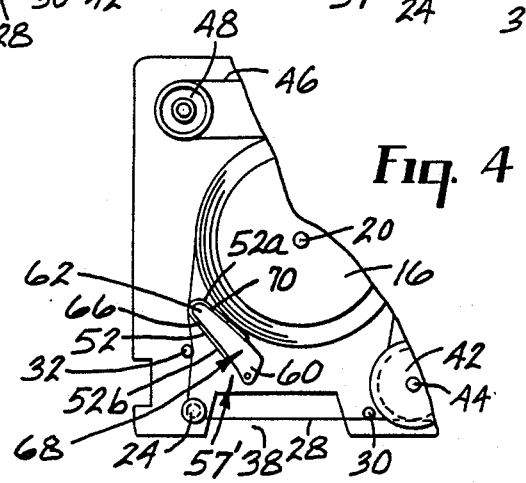
FIG. 4 is a top view of a portion of a cartridge having a cleaning device according to yet another embodiment of the present invention.

FIG. 4 illustrates an alternate embodiment of the mounting arm. In FIG. 4, the mounting arm 68 of cleaning device 57' has a curved tape-contacting surface 70 which, although adequate, is not as efficient as the embodiment of FIG. 3. Additionally, although not shown, the mounting arm 68 can be located on the side of the tape opposite the adjacent tape reel if only the magnetic side of the tape is to be cleaned. This embodiment may require a separate biasing device to maintain contact between the cleaning material and the tape.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention. For example, in addition to reel to reel magnetic data tape cartridges, the cleaning device can be used with single reel data cartridges, reel to reel audio or video cassettes, and 8-track audio cassettes.

We claim:

1. A cleaning device for removing debris from tape contained in a reel to reel magnetic data tape cartridge and extending along a tape path extending from one reel to the other and around a pair of tape guides wherein the tape guides are located adjacent one edge wall of the tape cartridge and each tape guide is associated with a respective tape reel, the cleaning device comprising:
   cleaning material located between one tape guide and its associated tape reel along the tape path such that tape tension always biases the magnetic side of the tape against the cleaning material regardless of the amount of tape wound on the associated tape reel to remove debris from the tape as the tape passes and contacts a portion of the cleaning material, and wherein the tape contacts different portions of the cleaning material depending on the amount of tape wound on the tape reel; and
   means for mounting the cleaning material in the tape cartridge.

2. A cleaning device according to claim 1 wherein the cleaning material is a material capable of wiping debris from the tape and further comprises means for retaining the debris wiped from the tape.

3. A cleaning device according to claim 1 wherein the mounting means further comprises a pin and a wiper support mounted on the pin wherein the cleaning material is fixed to the wiper support.

4. A cleaning device according to claim 1 wherein the cleaning material is positioned along the tape path to simultaneously contact the tape wound on one tape reel and the tape extending from the one tape reel along the tape path to clean both major surfaces of the tape.

5. A cleaning device for removing debris from tape contained in a tape cartridge having at least one reel of tape, wherein the tape extends along a tape path, the cleaning device comprising:
   cleaning material located adjacent the tape path such that tape tension biases the tape against the cleaning material regardless of the amount of tape wound on the tape reel to remove debris from the tape as the tape passes and contacts a portion of the cleaning material, wherein the tape contacts different portions of the cleaning material depending on the amount of tape wound on the tape reel; and
   means for mounting the cleaning material in the tape cartridge and for permitting rotational movement of the cleaning material in response to changes in the direction of movement of the tape to thereby provide at least two contact portions on the cleaning material to alternately contact the tape to permit debris removal from the tape at more than one contact portion.

6. A cleaning device according to claim 5 wherein the cleaning material is a material capable of wiping debris from the tape and further comprises means for retaining the debris wiped from the tape.

7. A cleaning device according to claim 5 wherein the mounting means further comprises a pin and a wiper support rotatably mounted on the pin and wherein the cleaning material is fixed to the wiper support.

8. A cleaning device according to claim 7 wherein the wiper support has a substantially cylindrical surface and the cleaning material is fixed to the substantially cylindrical surface.

9. A cleaning device according to claim 8 wherein the substantially cylindrical surface extends around only a portion of the wiper support and forms a tape cleaning surface having a radius of curvature larger than the distance between the center of the pin and the tape cleaning surface to provide a larger cleaning length without increasing the radius of the wiper support.

10. A cleaning device for removing debris from tape contained in a tape cartridge having at least one reel of tape wherein the tape extends along a tape path, the cleaning device comprising:
   cleaning material located adjacent the tape path such that tape tension biases the tape against the cleaning material regardless of the amount of tape wound on the tape reel to remove debris from the tape as the tape passes and contacts the cleaning material; and
   a mounting arm having a free end and a fixed end, the fixed end being pivotably mounted in the tape cartridge and the cleaning material being attached to the free end, wherein the changing radius of the tape wound on the tape reel as tape is wound or unwound on the tape reel pivots the mounting arm to change the position of the cleaning material along an arc traversed by the mounting arm free end thereby providing a plurality of contact portions on the cleaning material to permit debris removal from the tape at more than one contact portion, wherein the contact portion which contacts the tape depends on the position of the cleaning material.

11. A cleaning device according to claim 10 wherein the cleaning material is a material capable of wiping debris from the tape and further comprises means for retaining the debris wiped from the tape.

12. A cleaning device according to claim 10 wherein the cleaning material has at least two cleaning surfaces and is positioned between the tape reel and the tape extending from the tape reel along the tape path such that a first cleaning surface contacts the magnetic side of the tape wound on the tape reel and the second cleaning surface simultaneously contacts the back side of the tape extending from the tape reel along the tape path.

13. A cleaning device according to claim 12 wherein the cleaning material is mounted on and extends beyond the free end of the mounting arm, contacts both sides of the tape, and is flexible to wedge between the tape on the tape reel and the tape extending from the tape reel during the operation of the tape cartridge.

* * * * *